United States Patent
Davie et al.

(10) Patent No.: US 6,430,155 B1
(45) Date of Patent: Aug. 6, 2002

(54) CONGESTION AVOIDANCE ON COMMUNICATIONS NETWORKS

(75) Inventors: Bruce Davie, Belmont; Daniel C. Tappan, Boxborough, both of MA (US); Jeremy Lawrence, Newtown (AU)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/201,337

(22) Filed: Nov. 30, 1998

(51) Int. Cl.[7] .............................................. G01R 31/08
(52) U.S. Cl. ...................................................... 370/232
(58) Field of Search ................................. 370/232–236, 370/412, 252, 242, 352, 395–401; 349/252; 355/229–235; 389/395–401; 230/356–359, 352, 392–393, 468; 709/238, 239, 235, 224, 242; 379/221.01–221.14, 243

(56) References Cited

U.S. PATENT DOCUMENTS

| | | | | |
|---|---|---|---|---|
| 5,570,360 A | * | 10/1996 | Klausmeier et al. | 370/232 |
| 5,748,901 A | * | 5/1998 | Afek et al. | 370/229 |
| 5,918,017 A | * | 6/1999 | Attanasio et al. | 709/224 |
| 5,920,705 A | * | 7/1999 | Lyon et al. | 370/409 |
| 6,061,330 A | * | 5/2000 | Johansson | 370/230 |
| 6,069,872 A | * | 5/2000 | Bonomi et al. | 370/236 |
| 6,285,658 B1 | * | 9/2001 | Packer | 370/230 |
| 6,295,296 B1 | * | 9/2001 | Tappan | 370/392 |
| 6,304,574 B1 | * | 10/2001 | Schoo et al. | 370/401 |

OTHER PUBLICATIONS

ATM Forum Traffic Management Specification Version 4.0, Apr. 1996.

* cited by examiner

*Primary Examiner*—Kwang Bin Yao
*Assistant Examiner*—Prenell Jones
(74) *Attorney, Agent, or Firm*—Cesari and McKenna, LLP

(57) ABSTRACT

An interface (12, 14, or 16) in a service-provider network's transit label-switching router (P2) employs resource-management messages to inform neighbor routers of the bandwidths that it can allocate to various routes that it supports. To allocate its available bandwidth, it employs a weight value set for the route by an ingress router (PE2) in a system to which the label-switching router belongs. The transit router treats the weight as a relative bandwidth: when the sum of the bandwidths requested for various routes exceeds the bandwidth available, the router sets the bandwidths for at least some routes in accordance with the ratio of a given route's weight to the sum of the weights assigned to all routes among which it divides available bandwidth in this manner. That is, it assigns at least some bandwidth to all such routes, regardless of how small the resultant bandwidth may be. In this way, the network can operate with virtually no packet loss and yet remain available to all of its customers.

28 Claims, 11 Drawing Sheets

CONGESTION AVOIDANCE ON COMMUNICATIONS NETWORKS

BACKGROUND OF THE INVENTION

The present invention is directed to communications networks. It particularly concerns congestion avoidance.

Internetwork communications are based on operations of routers, which are network devices that determine, on the basis of destination information in packets that they receive, where to forward the packets so that they are likely to reach the intended destinations.

Router configurations vary widely, but FIG. 1 depicts a typical approach. Router 10 includes a plurality of communications interfaces 12, 14, and 16, which send and receive communications packets to and from remote locations. When one of the interface modules receives an incoming packet, it places header information from that packet onto an internal communications bus 18 by which it communicates with a forwarding engine 20, typically a high-performance processor and associated storage circuitry, that determines where the packet should be sent. Once the decision has been made, an output packet is formed from the input packet by packet-assembly circuitry that may reside in one or more of the interface modules and/or the forwarding engine, and the forwarding engine causes another interface to send the output packet to a further remote location.

FIG. 2 depicts the router 10 in a local-network environment in which it communicates through one of its interfaces with a local-area-network bus 22. There are typically a number of network devices, such as network devices 24, 26, 28, and 30, that receive the resultant signals, but the packet is not usually intended for all of them. To enable its various network devices to distinguish the packets they should read from the ones they should not, a system may employ a packet format such as the Ethernet format that FIG. 3's second row depicts. An Ethernet frame's link-layer header 32 includes, among other fields, one that contains a link-layer destination address, as FIG. 3's first row indicates. Any network-device interface whose link-layers address does not match the pocket's destination-address field will ignore the packet.

For present purposes, we will assume that FIG. 2's router 10 intends for a further router 30 to receive the packet, so the link-layer header's destination-address field contains the link-layer address of router 30's interface with network link 22. That interface accordingly reads the remainder of the packet, verifying that the packet and its cyclicredundancy-code ("CRC") trailer's contents are consistent. Router 30 then proceeds to process the link-layer packet's payload 36 in accordance with a protocol that the link-layer header's type field specifies.

In the illustrated case, the type field specifies that the link-layer packet's payload is an Internet Protocol ("IP") datagram, which is a network-layer protocol data unit ("PDU") that consists of an IP header and payload. The IP header is similar to the Ethernet header in the sense that it has source- and destination-address fields. But the destination-address field in this case does not identify the next network node to handle the packet. Instead, it contains a route identifier in the form of the network address of the destination node to which the packet should ultimately be forwarded. That is, a router to which the Ethernet (or other link-level) header directs the packet will read the IP header's destination-address field and identify, on the basis of that field's contents, the "next-hop" router to which forwarding the packet will advance it toward that ultimate destination.

Similarly, the IP header's source address does not identify the forwarding router but rather the node that was the IP datagram's initial source.

The IP protocol provides for what is termed an "unreliable" delivery. That is, there is nothing in the protocol itself to ensure that the host with which the packet's internetwork address is associated will actually receive that packet. For various reasons, routers along the way to the destination may not be able to forward that particular packet, so the packet will not reach its destination. The IP datagram's payload may therefore include information that source- and destination-host processes can use to ensure proper information delivery, i.e., to determine whether the destination has received all the source's transmissions and cause the source to re-send any that are missing.

One way to achieve this result is to employ a reliable transport protocol, such as the Internet community's Transmission Control Protocol ("TCP"). Specifically, if the IP header's protocol field contains the code that specifies TCP, the ultimate-destination host will use its TCP process to deal with the IP payload. FIG. 3's third, fourth, and fifth rows show how the TCP process interprets that payload. Specifically, the IP datagram's payload is considered to be a TCP segment, consisting of a TCP header and a TCP payload. Among its other fields, the TCP header includes source- and destination-address fields, which specify by "port numbers" the host applications that send and receive the TCP payload.

Of particular interest in connection with the transmission's reliability are the TCP header's sequence-number and acknowledgment-number fields. A sequence of TCP segments sent from one port of one node to the same or another port of another node are considered to constitute a single session. If set, a "SYN" flag in FIG. 3's fifth row indicates that TCP segment containing it is the first in a session. TCP segment containing a set "FIN" flag is the session's last. The sequence-number field in a segment carrying the SYN flag contains a number arbitrarily assigned to the first byte of that session's data. Beginning with that number, the TCP process increments an internal count for each byte sent in each of the same session's (multiple-byte) segments. Each segment's sequence number field contains the sequence number thereby assigned to that segment's first byte.

The receiving TCP process is expected to acknowledge each received segment, and a set "ACK" flag in a segment from the receiving process indicates that the segment's acknowledgment-number field is the next-numbered byte that it expects. Such an acknowledgment means that the receiving process has received bytes associated with all sequence numbers from the SYN-segment sequence number to the number just before the current segment's acknowledgment number.

By its response, a receiving TCP process controls the rate at which the sending process transmits data to it. Specifically, it places in the TCP header's window-size field an indication of the number of bytes the sender can transmit before it has to stop to wait for an acknowledgment. If the receiving TCP process has two kilobytes of capacity left in its input buffer, for instance, it may specify a window size of two kilobytes to ensure that the sending TCP process transmits no more bytes than that before it receives further acknowledgment. If the receiving TCP process acknowledges received bytes only after it has removed them from its input queue, the sender process will not sent the receiver more bytes than its queue can handle. A relatively slow receiving TCP process can thereby prevent a higher-capacity sending TCP process from overwhelming it with data.

But this does not prevent an intervening router from being overwhelmed by the resultant flow or, more typically, by that flow in combination with the others that the router must handle. When a router is overwhelmed, it typically simply discards the excessive IP packets. This discarding does not impair the TCP processes' reliability, because a sending TCP process re-transmits bytes that have remained unacknowledged for more than a predetermined time interval. But discarding packets and re-sending them wastes bandwidth.

To avoid such waste-causing congestion, a TCP sending process often employs what is known as a "slow start," in which it initially transmits at a rate that is less than the receiver process's advertised window size would otherwise permit. In a typical slow-start operation, the sending process sends only a single segment and then waits for the resultant acknowledgment. If it receives the resultant acknowledgment, it sends two and then again waits for an acknowledgment. It then sends four after those two have been acknowledged. The number of permitted unacknowledged segments thus increases exponentially until it is limited by the receiving TCP process's window size—or until the transmitting TCP process fails to receive an acknowledgment within the required time limit. If such a failure occurs, the sending TCP process concludes that the segment may not have successfully reached its destination, possibly because an intervening router's capacity has been exceeded. It therefore stops the exponential increase and limits the permitted number of outstanding segments to a level that does not provoke unacknowledged segments. The sending and receiving processes thereby accommodate not only each other's limitations but also those of the routers employed in communicating between them.

SUMMARY OF THE INVENTION

We have recognized, though, that this approach to congestion avoidance has certain limitations. Not the least of these is that it forces, say, an Internet-service provider ("ISP") to rely for congestion avoidance on client-network nodes, i.e., nodes over which it has no control. We have solved this problem by adapting to it a congestion-avoidance approach commonly employed in Asynchronous Transfer Mode ("ATM") networks.

ATM networks sometimes employ a congestion-avoidance approach known as adjustable bit rate (ABR), in accordance with which a source of ATM communication cells transmits resource-management cells (RM cells) along a given virtual channel. Before it communicates on such a channel, the source asks for an ATM virtual channel with certain ABR-related parameters. These include the Peak Cell Rate (PCR—the maximum rate at which it may send cells) and the Minimum Cell Rate (MCR—the lowest rate at which it can be told to send cells). These parameters do not change so as long as the virtual channel remains in place. If the switches along the virtual channel's path do not have enough capacity to accommodate the MCR, the virtual channel will not be established.

Once the connection is established, the source sends periodic resource-management cells. The resource-management cell specifies a desired cell rate in an explicit-rate ("ER") field. ATM switches forward the resource-management cell along the virtual channel's route and back again to the source, and each switch along the route determines whether it can allocate the requested bandwidth to that virtual channel.

If a switch that receives a resource-management cell can accommodate the requested bandwidth, it forwards the resource-management cell without revising the explicit-rate field. If the switch cannot accommodate the requested rate but can accommodate the minimum rate, it forwards the resource-management cell with the explicit rate set to the lesser rate that the switch can accommodate. When the resource-management cell finally returns to the source, it thereby tells the source the rate at which the source may send. The source then limits itself to this rate, so the ATM system suffers virtually no cell loss.

We have recognized that this approach is nonetheless unacceptable, or at least undesirable, for a great number of applications. It is true that such an arrangement permits the ISP to avoid bandwidth waste within its network. But an attempt to establish a channel may fail due to lack of bandwidth. The ISP's customers can thereby be denied access, and customers interpret this as a lack of ISP reliability.

We have solved this problem by employing a system that replaces minimum rates with what we refer to as weights. Specifically, if a router does not have the capacity to meet the total bandwidth requested for all the flows that propose to share it, it simply allocates in proportion to the different routes' advertised weights the bandwidth that it can provide. In doing so, there are at least some flows on which it imposes no minimum rate at all. Those flows are therefore guaranteed some access to the ISP network, regardless of how little bandwidth is available.

In addition, the existing ABR approach is only available in a network using ATM technology. We have extended the ABR technique to networks of IP routers and label-switching routers that may utilize a wide range of underlying network technologies.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
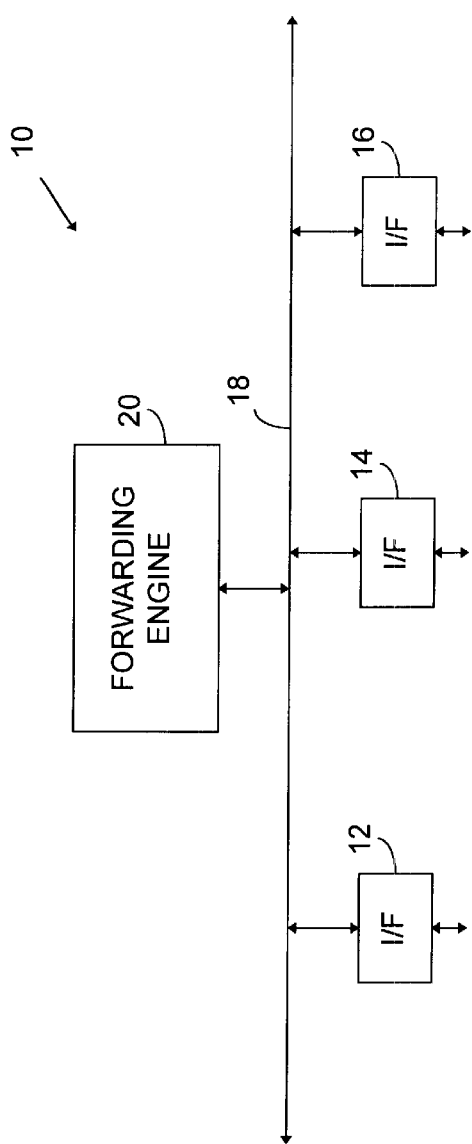
FIG. 1, discussed above, is a block diagram of a router of the type in which the present invention's teachings can be employed.
Figure 2:
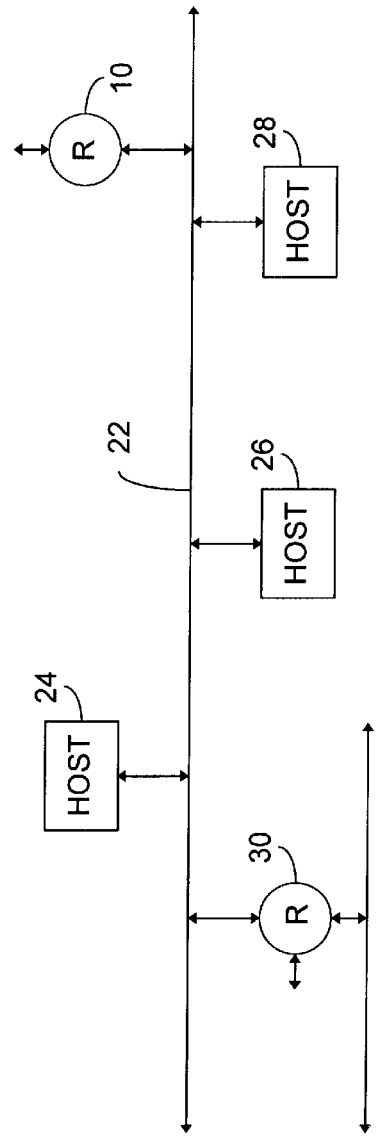
FIG. 2, described above, is a block diagram illustrating the topology of a typical local network that includes such routers.
Figure 3:
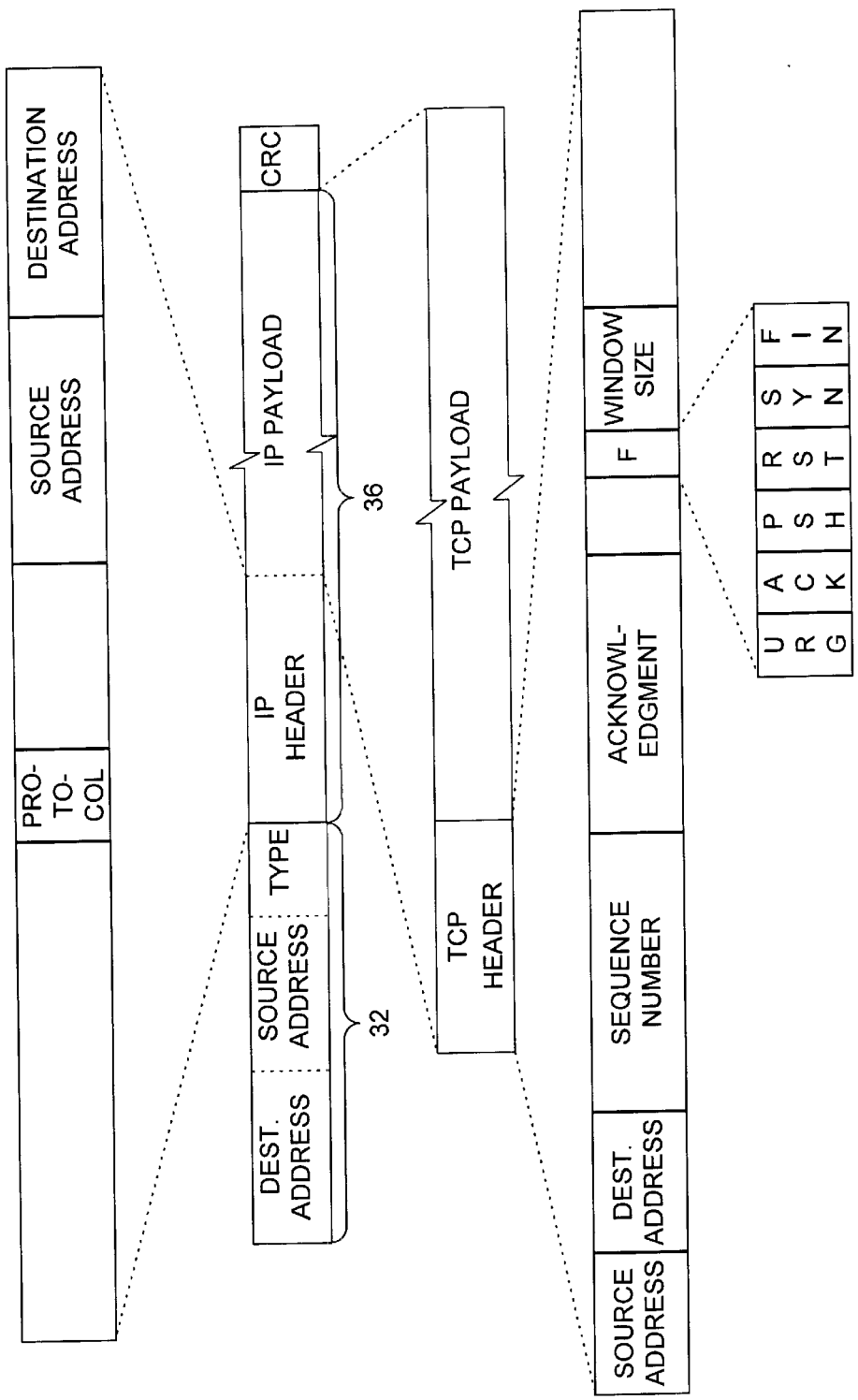
FIG. 3, described above, is a diagram illustrating the format of the type of communications packet that routers conventionally receive and forward.

Although it will be apparent as the description proceeds that the present invention's teachings can be applied to a more-typical TCP/IP system, we prefer to implement them in systems that employ label-switching routers. To appreciate the manner in which such routers operate, recall that the IP header includes a destination-address field that identifies the internetwork node to which the IP datagram is ultimately to be forwarded. The router employs this address to determine which "next-hop" router to send the packet to by using a forwarding table, into which it has distilled information about internetwork topology that it has obtained in various ways, most typically by communications with other routers. Routers inform each other of the host systems to which they can forward communications packets, and they employ such information to populate their forwarding tables.

Now, the IP address is 32 bits long in most versions and even longer in versions that will soon be adopted, so the IP address could theoretically distinguish among over four billion host systems. Actually, the number of host systems that have globally unique IP addresses is much smaller that this, but the number still is considerably greater than the number of entries it is practical for an individual router's forwarding table to include.

The solution to this problem historically has been to base the table look-up on destination-address prefixes. That is, some routers will simply indicate that they can handle traffic to all hosts whose destination addresses begin with a particular, say, 16-bit sequence, or "prefix." Additionally, a router may compact its information so as to store routes in this form. Prefixes vary in length, the longest being the most specific and thus presumably representing the best routes to the included host addresses. So when a router receives an IP datagram, it searches through the prefix entries in the forwarding table to find the longest prefix that matches the incoming packet's destination address. When it finds that route in its forwarding table, it reads that route's fields that specify the interface over which it should forward the packet and the link-layer address of the router to which the interface should send the packet for further forwarding.

Although this approach has proved quite serviceable and robust, it has exhibited shortcomings that have led some workers to propose a table-index-based forwarding method for high-speed networks such as those of some Internet-service providers ("ISPs"). Specifically, routers would inform their neighbor routers of the locations within their tables at which the routes to particular prefixes are located. When their neighbors send them packets destined for hosts whose addresses begin with those prefixes, they insert a "shim" between the link-layer header (such as an Ethernet header) and the network-layer header (typically, an IP header). This shim's contents include a label, which is like a destination address in that it is a route indicator. But, instead of specifying the ultimate destination's network-layer address directly, the label serves as an index to the desired route in the receiving router's forwarding table. (Workers in this art currently use the term tag interchangeably with the term label in this context, and we will do so below.)

One of this approach's advantages is that it relieves the receiving router of the need to perform an expensive longest-match search: the label leads the receiving router directly to the correct forwarding-table entry. More important, it affords ISPs the opportunity to have their ingress routers (which receive packets from outside the service-provider network) specify the egress routers by which received packets should issue from the network. This frees the ISP's interior ("transit") routers of the task of participating in forwarding policy and maintaining the associated information bases. Commonly assigned co-pending U.S. patent application No. 08/997,343, filed on Dec. 23, 1997, by Rekhter et al. for Peer-Model Support for Virtual Private Networks with Potentially Overlapping Addresses, describes in detail one proposal, known as Multiple-Protocol Label Switching ("MPLS"), for employing such shims. We hereby incorporate that application in its entirety by reference.

Figure 4:
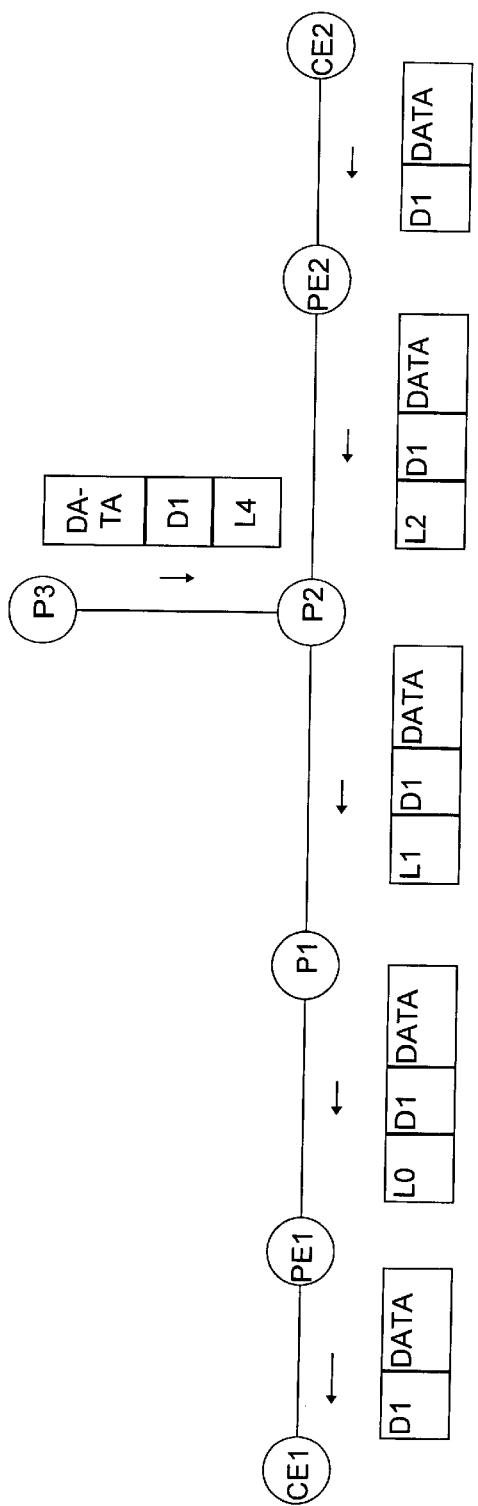
FIG. 4 is a diagram that illustrates a label-switching router's operations of imposing and removing shim headers and replacing their stack entries.
Figure 5:
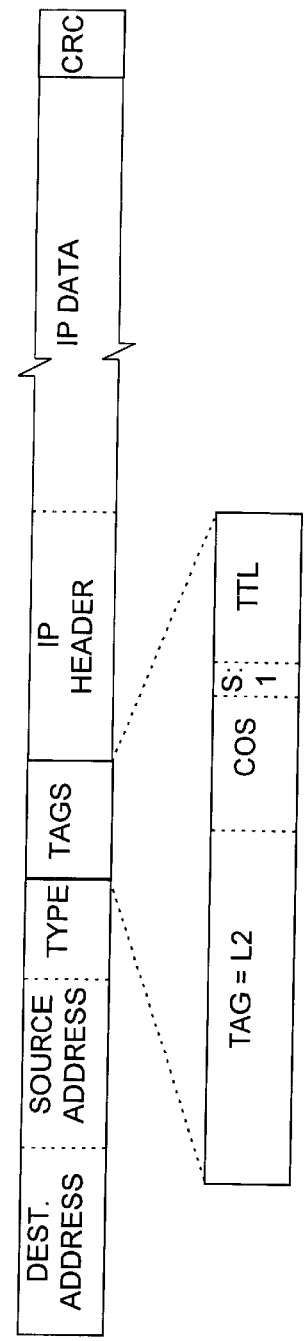
FIG. 5 is a diagram illustrating the format of a packet that a label-switching router may receive and/or forward in an Ethernet link.

FIGS. 4 and 5 illustrate how such an operation can be performed. A customer router CE2 forwards a packet to an ISP network's ingress router PE2. The link-layer packet's payload consists of a datagram, including the datagram's payload data and a header that gives the ultimate destination's (network-layer) address as D1. The ISP needs to perform its routing rapidly, so it employs the label switching just described.

Router PE2 is an "edge" router: it has direct links with routers, such as customer router CE2, that are outside the service-provider network. The ISP's edge routers maintain communications with other edge routers, such as edge router PE1, to tell them the address prefixes of hosts outside the provider network to which they can forward packets. Because of this communication, router PE2 placed in its forwarding database an indication that packets having a prefix that matches address D1 should be sent to PE1 for forwarding outside the service-provider network. Since PE1 is not PE2's immediate neighbor, PE2 additionally looked up forwarding information for PE1 when it installed the route to the D1-including prefix into its forwarding table, and it found that packets destined for PE1 should be sent to neighbor router P2 for forwarding. We assume that it had additionally received from P2 a request that packets sent to router P2 for forwarding to router PE1 should be labeled with label L2.

When router PE2 receives the D1-destined packet from customer router CE2, it finds this information in its database through a conventional longest-match search. So router PE2 includes label L2 in a shim ("tags") header that it prepends to the incoming packet's datagram. That label is router P2's forwarding-table index to information for forwarding packets toward PE1. For the sake of example, FIG. 5's first row shows the result as encapsulated in an Ethernet (link-layer) header and trailer.

As FIG. 5's second row illustrates, the Tags field may contain one or more tags arranged as a stack. In this example, only one tag is required. Each stack entry includes a label, or "tag," field itself as well as further fields. One such field is an end-of-stack ("S") field. That field consist of one bit that indicates whether the stack entry is the bottom entry in the tag stack. The end-of-stack field's value is zero for all labels except the last, or "bottom" label. In this example, there is only one label, so its stack bit is one.

The next router, router P2, rapidly finds forwarding information for the received packet because the label entry in the shim header contains the label L2 that identifies destination PE1's correct entry in router P2's forwarding table. Among that table entry's information is the value of the label that the next router P1 has asked to be placed on packets sent to it for forwarding to PE1. Router P2 accordingly replaces the current stack entry, label L2, with the label, L1, that router P1 has advertised. Finally, router P1 sends the packet to PE1, replacing label L1 with label L0, which is the label that PE1 advertised.

Since L0 indicates that the packet is to be delivered to PE1, PE1 looks into the packet to read the destination address D1, and hence determine how to further deal with the packet. Previously, PE1 had determined that packets destined for the prefix including D1 should be passed straight to a further customer router CE1. It may have determined this by having been programmed with this information, or by other means. Guided by this information, router PE1 forwards the packet to CE1. In doing so, it removes the shim header because customer router CE1 does not employ label switching.

The path along which such tag-switching routers conduct a packet is known as a "tag-switched path" or "label-switched path." In the example, the tag-switched path is the path from PE2 through P2 and P1 to PE1.

Although the link-layer and network-layer protocols in the FIG. 5 example are Ethernet and IP, respectively, other protocols can also support label use. Indeed, some are particularly well suited to it. For example, label-switching routers can be implemented in ATM switches that exchange communications cells whose format FIG. 6 depicts.

Figure 6:
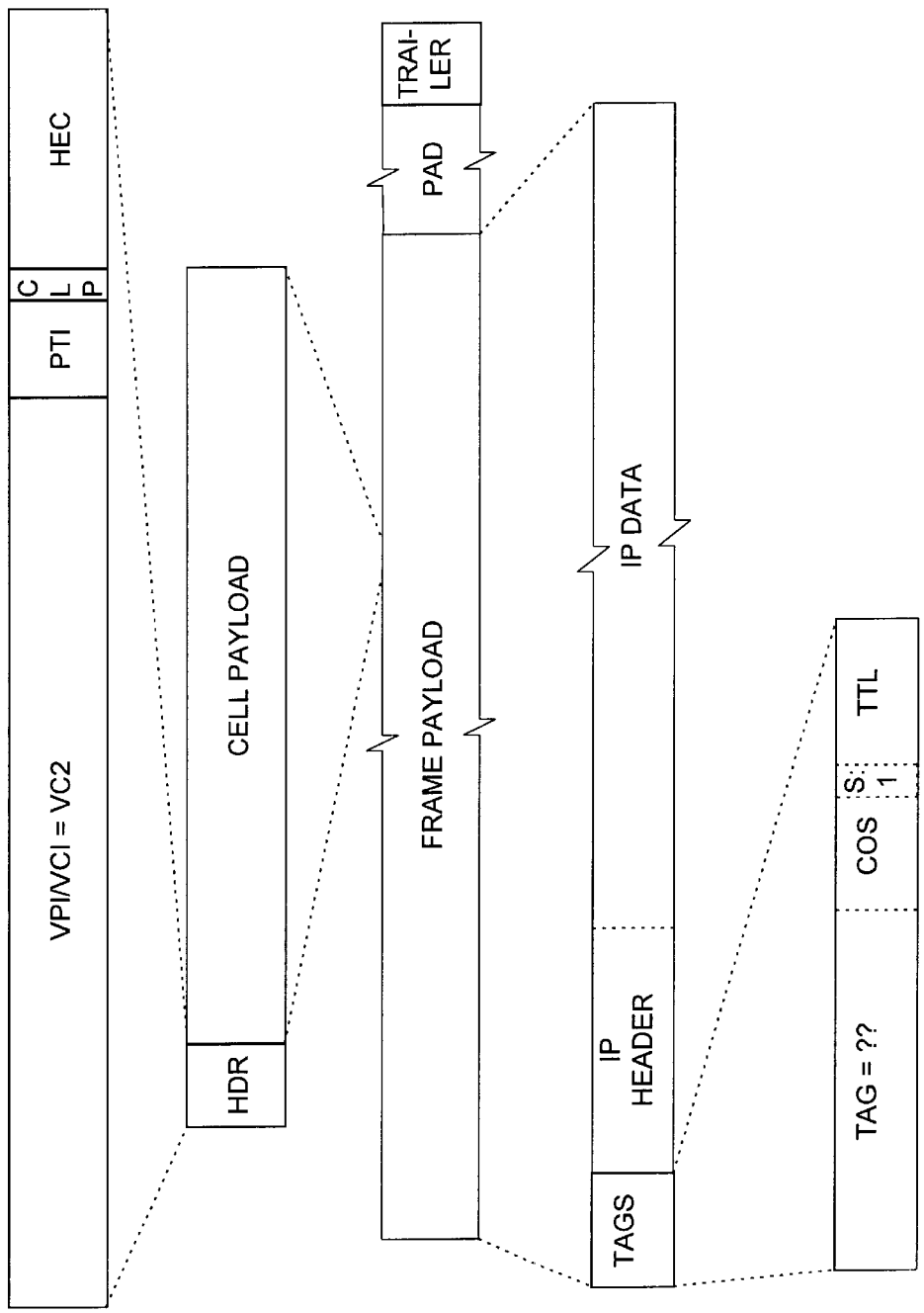
FIG. 6 is a diagram illustrating the format of a packet that an ATM-implemented label-switching router may receive and/or forward.

FIG. 6's third row depicts an ATM frame, and its fourth and fifth rows show that the frame's payload is similar to the IP datagram and shim header that FIG. 5's Ethernet header and trailer encapsulate. The only difference is that FIG. 6's fifth row represents the (top) tag by question marks, which indicate that the top tag's contents do not matter.

The reason why they do not is that the routing decisions that FIG. 4's P2 bases on those contents when P2 is implemented as an IP router are instead based on an ATM VPI/VCI field in the header of an ATM "cell" when P2 is implemented as an ATM switch. From the point of view of an ATM client, the frame of FIG. 6's third row is the basic unit of transmission, and it can vary in length to as much as 64 Kbytes of payload. (Those skilled in the art will recognize that there are also other possible ATM frame formats, but FIG. 6's third row depicts one, known as "AAL5," that would typically be employed for user data.) From the ATM switch's point of view, though, the basic transmission units are fixed-size cells into which the frames are divided.

Each cell consists of a header and a payload, as FIG. 6's second row illustrates. Among the purposes of the header's PTI field, depicted in FIG. 6's first row, is to indicate whether the cell is the last one in a frame. If it is, its last eight bytes form the frame trailer field that FIG. 6's third row depicts. Among other things, the trailer indicates how much of the preceding cell contents are actual payload, as opposed to padding used to complete a fixed-size cell.

The header field of interest to the present discussion is the VPI/VCI field of FIG. 6's first row. As is well known to those skilled in the art, ATM systems organize their routes into "virtual channels," which may from time to time be grouped into "virtual paths." Each switch associates a local virtual path/virtual channel indicator (VPI/VCI) with a channel or path that runs through it. When an ATM switch receives a cell, it consults the cell's VPI/VCI field to identify by table lookup the interface through which to forward the cell. It also replaces that field's contents with a value indicated by the table as being the next switch's code for that path or channel, and it sends the resultant cell to the next switch.

In other words, the function performed by the VPI/VCI field enables it to serve as the stack's top tag. This is the reason why a label-switching router implemented as an ATM switch can ignore the top tag field, on which other implementations rely.

We now turn to the present invention's teachings, which will be exemplified in a label-switching system of the type discussed above, although it will be apparent that the invention's applicability is not so limited.

Figure 7:
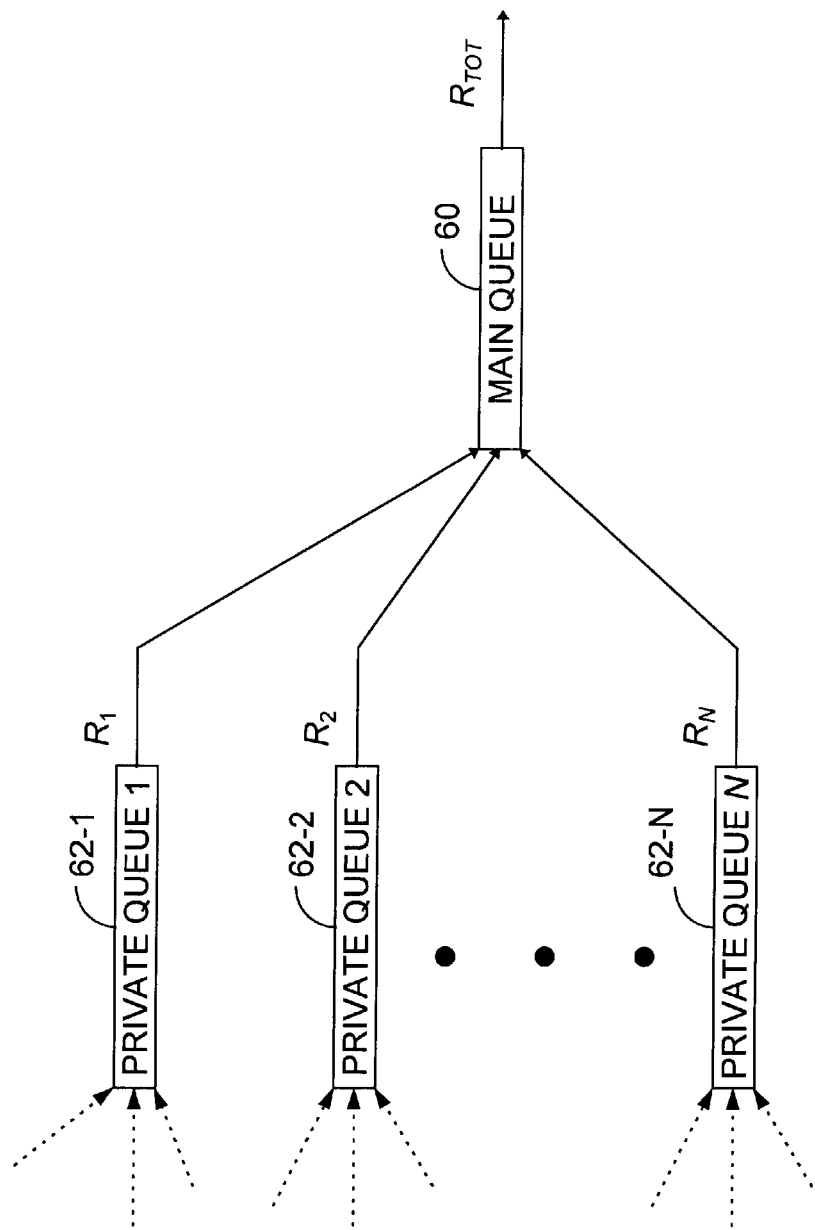
FIG. 7 is a diagram illustrating a general approach that a router may take to order its packet forwarding.

The present invention's teachings are directed to congestion avoidance. Each of a router's interfaces has speed limitations: it cannot transmit more than a maximum number of bytes per second. This maximum is the total of all of the data that it forwards. FIG. 7 represents this aspect of the interface's operation. The router maintains a queue 60 of packets that the router has assigned to that particular interface for forwarding. The interface can forward these packets on a first-come, first-served basis, but it is more typical for a router to divide its available bandwidth up among the packets in some other way. In the illustrated example, we assume that the division occurs in accordance with the destinations of the packets to be forwarded. In the example label-switching environment, this means division by packet label.

Each label is assigned its own queue, such as queues 62-1, 62-2, ..., 62-N, each of which receives all of the packets containing a respective label. Also, the queues are assigned respective rates $R_1, R_2, \ldots, R_N$ at which data are read from them into the main queue 60 so that the sum of all of the rates equals a nominal interface output rate $R_{TOT}$. (Actually, the nominal interface output rate $R_{TOT}$ may be allowed to be slightly greater or less than the interface's physical output rate if the main queue is nearly empty or nearly full.) This relationship is based on the tacit assumption that the interface is receiving enough packets to keep it busy at its nominal rate. This is a useful assumption, since operation under such conditions is what necessitates queuing considerations.

But it raises the question, What happens when the interface's queues overflow because it has been receiving more data than it can forward? The simple answer is that it discards packets that it cannot store in a queue, and the router may report such occurrences to the discarded packets' sources. Although reliable transport mechanisms can accommodate such discarding, the system should endeavor to avoid the need for it.

This is the purpose for the present invention's congestion-avoidance mechanism, which involves what is known as resource-management messages. Such messages are used in the following way. Suppose that an ISP's edge router PE2 in FIG. 4 receives from several customer routers such as router CE2 various packets to which it applies label L2. To ensure that it is not forwarding so many thus-labeled packets that downstream routers may be overwhelmed, it periodically transmits a resource-management message into the tag-switched path. The resource-management message includes a field that contains an "explicit rate," i.e., a rate at which the ingress router proposes to send packets along that path. As will presently be described in detail, tag-switching routers forward the resource-management message along the path and back again. As they do so, each router determines whether it can handle the explicit rate that the message contains. If not, it reduces the explicit rate to one that it can sustain. So the returned resource-management message's explicit-rate field tells the ingress router how fast it can send packets into the tag-switched path without overwhelming downstream routers.

Figure 8:
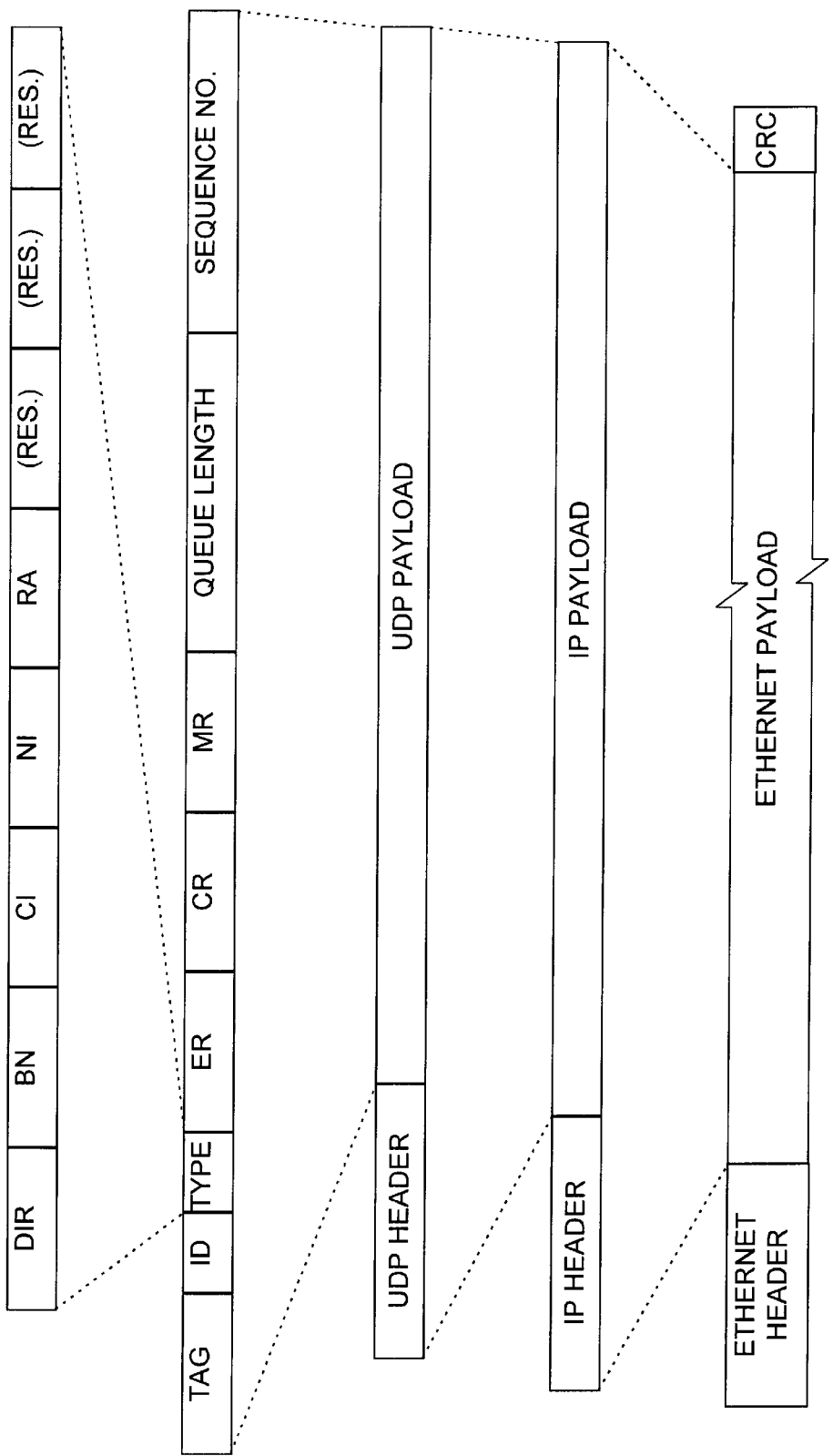
FIG. 8 is a diagram illustrating the format of a resource-management message that routers use to determine the packet rate to allocate to a given tag-switched path.

FIG. 8 illustrates one resource-management-message format, which non-ATM tag-switching routers will use. For the sake of example, FIG. 8's fifth row depicts the datagram as being sent over an Ethernet link, so the packet includes an Ethernet header and trailer. The link-level (Ethernet) payload is the IP datagram of FIG. 8's fourth row. The destination-address field (not shown) of that datagram's header specifies the ultimate destination as neighbor router P2: the datagram is a message for that router. (Although the FIG. 8 example does not include one, a shim header could be provided between the Ethernet and IP headers for the purpose described above.)

The IP header's protocol field (not shown) specifies that the payload contents are to be delivered to router P2's User Datagram Protocol ("UDP") process. That process interprets the IP payload as a UDP datagram that, as FIG. 8's third row indicates, includes a UDP header and a UDP payload.

As a TCP header does, the UDP header includes fields (not shown) that specify source and destination port numbers, and the destination port number in this case specifies router P2's resource-management application. So router P2 delivers the UDP payload to that application, which interprets the payload as having the format that FIG. 8's first and second rows depict.

Figure 9:
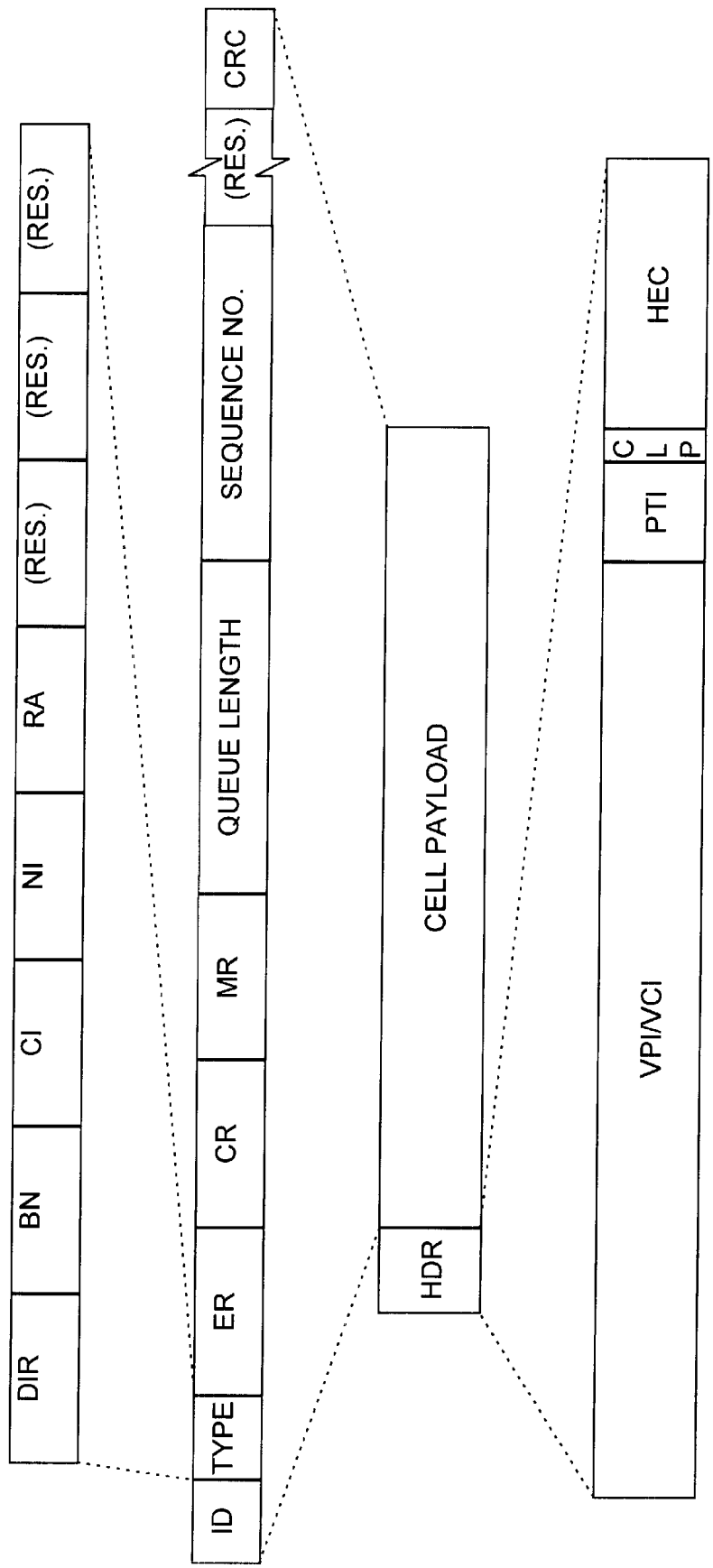
FIG. 9 is a diagram illustrating the format of a resource-management cell that an ATM switch uses for the same purpose.

Most of the illustrated fields simply correspond to similarly named fields of a conventional ATM resource-management cell illustrated in FIG. 9. ATM implementations of the present invention will employ the FIG. 9 format rather than that of FIG. 8 for the resource-management function, and those skilled in this art are familiar with the interpretations that ATM switches give those fields. So we will describe only the fields of particular interest here, among which are the type, tag, and explicit-rate ("ER") fields of FIG. 8's second row. The ER field contains a floating-point number that specifies the rate, in bytes per second, at which router PE1 requests permission to send packets having the label, say, L2, that the tag field contains.

Edge router PE2 places a zero in the type field's DIR field to indicate that this resource-management datagram is of the "forward" type: it is traveling away from its source rather than back to it. In the illustrated embodiment, transit routers such as router P2 normally make no change to forward-type resource-management datagrams' ER fields. So router P2 ordinarily just replaces the tag field's label L2 with label L1 and sends the resultant datagram (with appropriate changes to lower-level headers) to the next transit router P1 without changing the ER-field contents.

An exception to P2's usual behavior of leaving a forward-directed resource-management datagram's ER field unchanged occurs when routes merge at P2. For example, suppose that P2 places label L1 not only on L2-labeled data packets that it receives from PE2 but also on some data packets from another neighbor P3. For the sake of explanation, let us assume that those from neighbor P3 bear a different label, say, L4, although a non-ATM-implemented label-switching router would more typically advertise the same label to both neighbors. In such a situation, router P2 responds to an $ER_{PE2}$-containing L2-labeled forward resource-management datagram from PE2 by sending P1 a forward resource-management datagram whose ER field contains the sum of $ER_{PE2}$ and the ER field contents of the last L4-labeled forward resource-management datagram received from P3.

When PE1 receives the resource-management message, it reads the label value in the resource-management message and determines that there is no next hop associated with that label. That is, PE1 is the end of the tag-switched path. In this embodiment, that means that the resource-management message must be turned around. So PE1 sends the resource-management message back in the direction from which it came, i.e., back to router P1, after changing the DIR contents to a logical one to indicate that the resource-management datagram is of the reverse variety. In handling a reverse-directed resource-management datagram, a router changes the ER field if the rate that it contains is not one that the router can sustain, as will now be explained.

Figure 10:
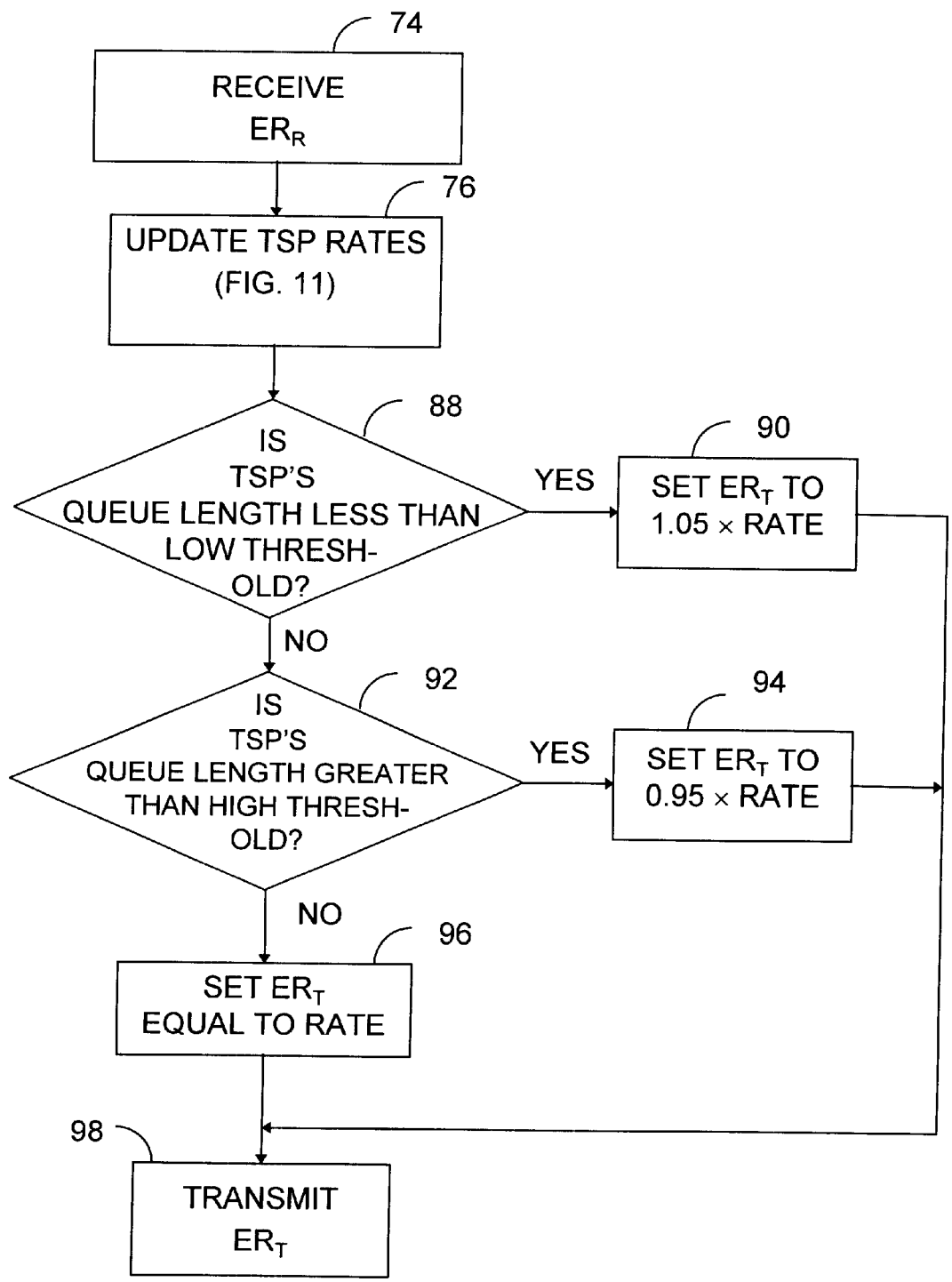
FIG. 10 is a flow chart illustrating the procedure used to determine the ER value that a router places in resource-management messages that it forwards.
Figure 11:
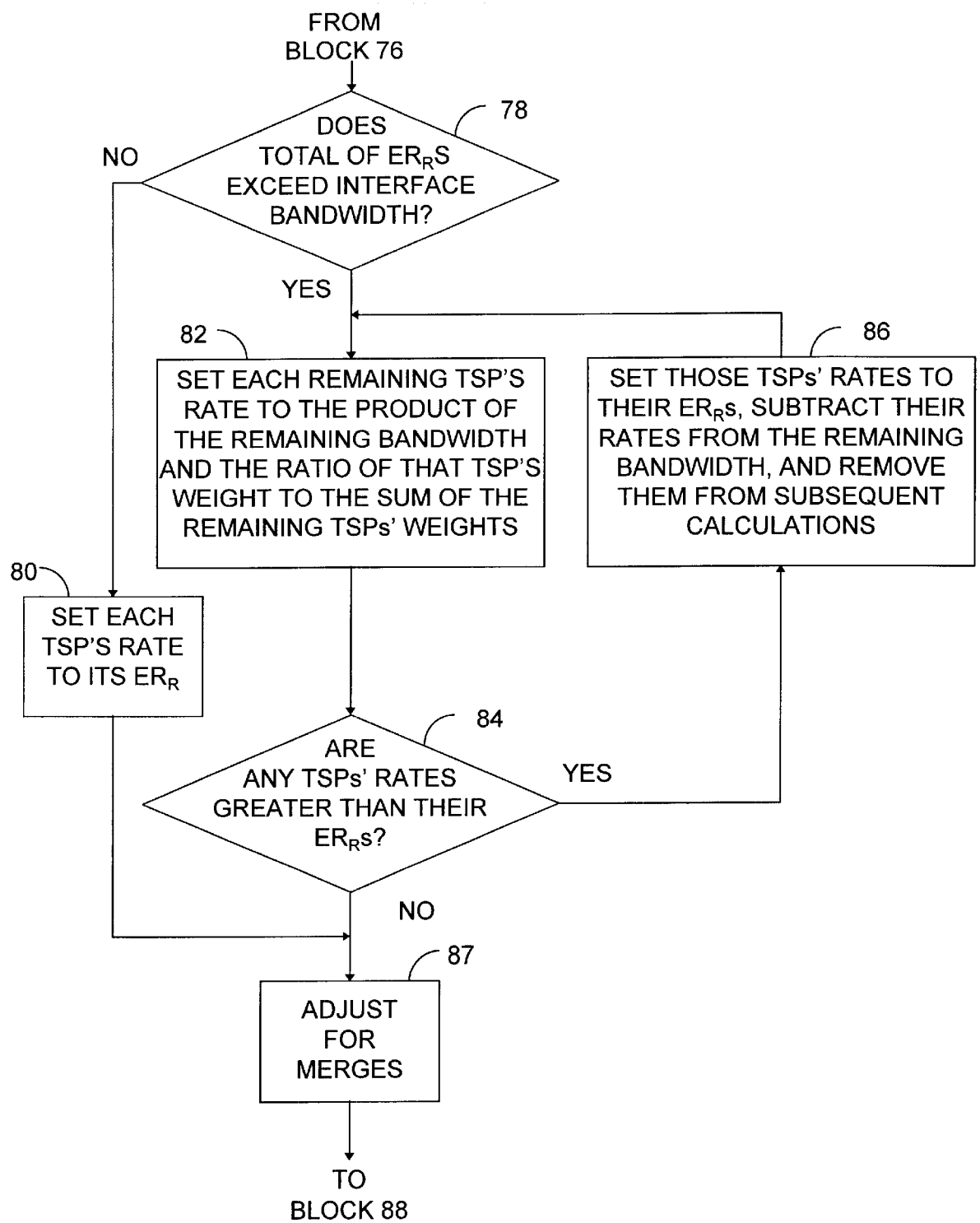
FIG. 11 is a flow chart illustrating the procedure used by a router to determine the rates at which to forward different channels' packets.

To determine whether the explicit rate contained in the datagram's ER field is one is that the interface can sustain for data packets tagged with the label that tag field 66 contains, the router must balance the rate allocated to that tag's route with those allocated to other tags' routes through the same interface. In accordance with the present invention, that operation involves the use of relative weights assigned to different tag-switched paths. It will be apparent as the description proceeds that this invention can be employed in many ways, and FIGS. 10 and 11 depict one example. As FIG. 10's blocks 74 and 76 indicate, the interface responds to receipt of a proposed explicit rate in a reverse resource-management datagram by updating the rates for all of its tag-switched paths in a manner that FIG. 11 depicts.

If the sum of that requested explicit rate and those of all other tag-switched paths that the interface handles does not exceed the interface's total link bandwidth, then the rate at which it sends data packets into that tag-switched path is the explicit rate that the received resource-management message contains, as FIG. 11 block's 78 and 80 indicate. (Recall that the nominal rate $R_{TOT}$ may be greater or less than the interface's physical output bandwidth if the common queue is nearly empty or full.) Otherwise, the interface allocates bandwidth in accordance with the tag-switched paths' respective "weights." Specifically, each tag-switched path's rate is set equal to the product of the total bandwidth and the ratio of that tag-switched path's weight, which is assigned in a manner that will be described presently, to the sum of all the tag-switched paths' similarly assigned weights, as block 82 indicates.

Now, the result of that operation could be that the rates for one or more of the tag-switched paths are greater than their requested rates. Any such path then is simply assigned its requested rate, and the process is then repeated with those paths removed from consideration, as blocks 84 and 86 indicate. This loop continues until no calculated rates exceed requested rates, after which block 87's merge-adjustment step occurs.

To understand the merge-adjustment step, it is important to appreciate that the rates with which FIG. 11's previous steps deal are rates for downstream paths, i.e., the collection of label-switched paths that remain after any merge at the router. But the purpose of the FIG. 10 operation, of which FIG. 11's operation is a part, is to set the rate for an upstream path, which may be merged with another to feed a downstream path. The block 87 step divides the rate determined for any merge-resulting downstream path into rates for its constituent upstream paths.

Different implementations may use different approaches to this division. One approach is to divide the downstream rate in accordance with the constituent upstream paths' weights. This approach can be used uniformly. Alternatively, it can be used only when, say, ER values previously recorded from those paths' forward-directed resource-management datagrams do not add up to that of their merge path's reverse-directed resource-management datagram. If the sum of the constituent paths' forward ER values does equal the merge path's reverse ER value, those forward values can be used instead. Other division approaches may also be used.

In the illustrated embodiment, the rates thus determined are not necessarily those that the router places in the reverse resource-management datagram that it sends to its upstream-neighbor router. Specifically, although a source router endeavors to send a given route's packets at the rate that downstream routers have allocated to it, some disparity between the downstream router's reception and transmission can nonetheless result, and the private queue for that path may become nearly empty or full. If that happens, the interface may place in the reverse resource-management cell a rate slightly greater or less than the rate that it has actually allocated for transmission of that path's cells. As FIG. 10's blocks 88 and 90 indicate, for example, it may set the outgoing reverse resource-management datagram's ER field to 1.05 times the allocated transmission rate if the path's queue is nearly empty. As blocks 92 and 94 indicate, the interface may similarly set the ER field to 0.95 times the intended transmission rate if that path's private queue is becoming too fill. Otherwise, as block 96 indicates, the explicit rate is set to the intended transmission rate, and the interface sends its upstream-neighbor router a reverse resource-management datagram containing that rate in its ER field, as block 98 indicates.

As was mentioned above, the reverse resource-management message is distinguished from resource-management messages of the forward variety by its DIR field's value. Additionally, the label that a router places in a reverse resource-management message's tag field is an index into the routing table of the resource-management message's sender, not, as in the case of a forward resource-management message, that of its receiver. For both forward and reverse resource-management messages, in other words, the label in the resource-management message between two routers is the one that packets following the tag-switched path to which the resource-management message applies will carry in the link between those routers.

Figure 12:
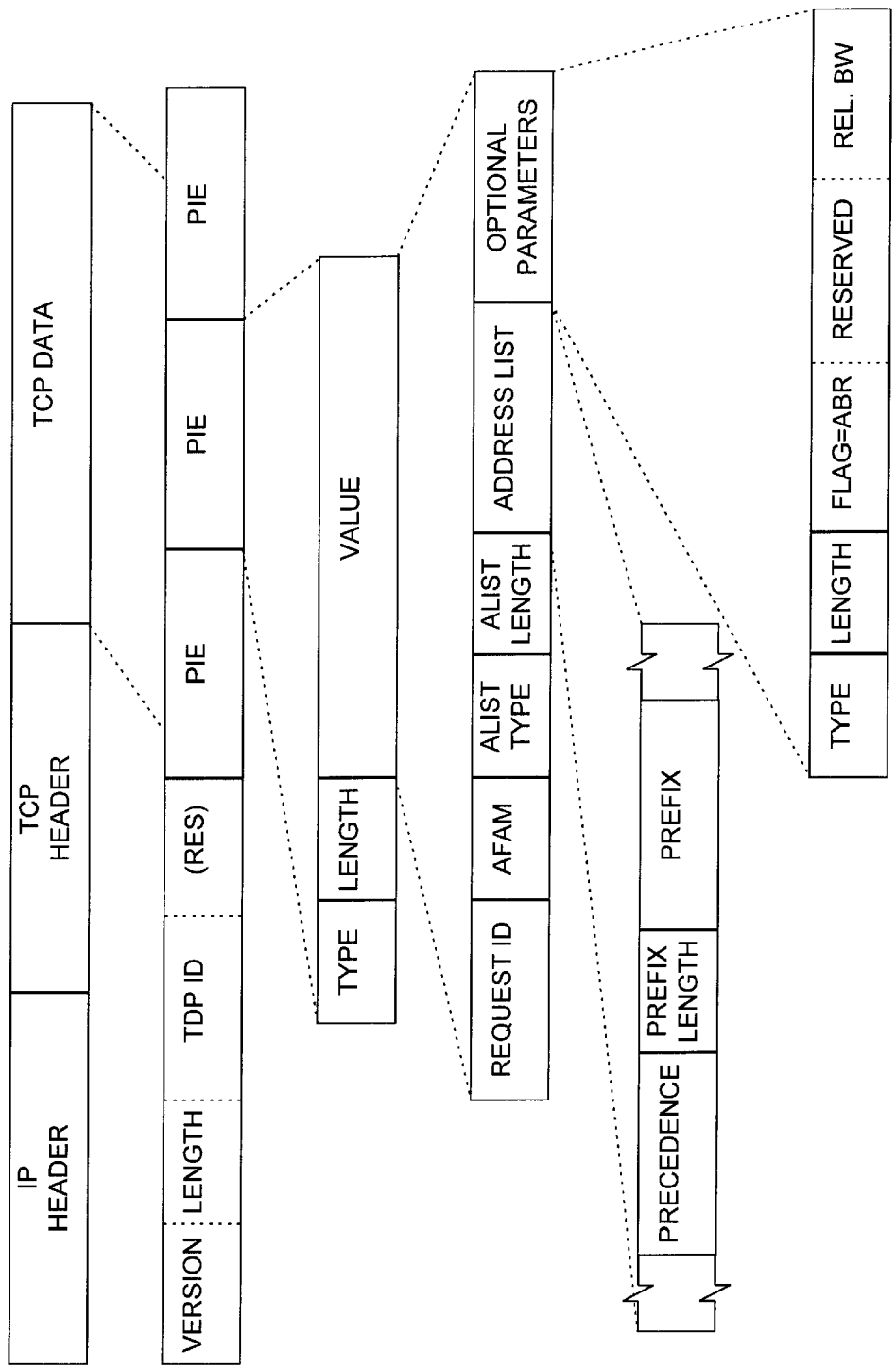
FIG. 12 is a diagram of the message format employed by label-switching routers to distribute relative weights that they use in determining the rates that they allocate to different tag-switched paths.

The weights that the routers use in implementing the congestion-avoidance mechanism can be advertised through an adaptation to the Tag-Distribution Protocol ("TDP") described in the above-mentioned Rekhter et al. application. FIG. 12's second row represents a TDP PDU. TDP is a two-party protocol. It requires a connection-oriented transport layer that provides guaranteed sequential delivery, so FIG. 12's first and second rows are intended to show TDP PDUs in a data stream that results from concatenation of TCP-segment payloads.

A TDP PDU begins with a fixed-length four-field header. The header's two-byte version field gives the number of the TDP version that the sender is using. The two-byte length field gives the length in bytes of the remainder of the PDU; i.e., it gives the total PDU length minus four.

As will be explained shortly, TDP communications occur in sessions, of which a given router can be conducting more than one at a time. The first four bytes of the sixbyte TDP ID field encode an IP address assigned to the router that started the TDP session, and the TDP ID field's last two bytes identify the particular session. A two-byte field reserved for further enhancements completes the header, and the remainder of the PDU comprises one or more protocol information elements (PIEs), which take the typelength-value format that FIG. 12's third row illustrates.

Each PIE's type field specifies its purpose, while its length field gives the length of its value field. Various PIE types have housekeeping purposes, such as instituting a TDP session between two routers, negotiating protocol versions, providing error notifications, and keeping the session alive. (If a router does not receive a same-session communication within a certain time-out period, it ends the session and discards the tags installed during the session.) Other PIE types are more directly involved with label distribution, which is the protocol's main purpose, and various of these can be used in distributing relative weights. One of these is the TDP_PIE_REQUEST_BIND type, for which the type field's contents are $0300_{16}$. A first label-switching router sends a neighbor router such a PIE type to request that the neighbor send the first router a label to be used when the first router sends the neighbor a packet having a particular destination-address prefix.

FIG. 12's fourth row depicts this PIE type's value field. The value field's requestID subfield contains a locally significant number that another router's response to this PIE will include to enable the requesting router to match the response with the request. The AFAM (Address Family) field is set to 1, indicating that the address prefixes contained in the PIE's binding list are intended to be interpreted as IP version 4 (IPv4). The ALIST TYPE and ALIST LENGTH fields give the format and length of an address-list field. If the ALIST TYPE field's value is $0001_{16}$, the address-list field uses (precedence, prefix-length, prefix) triples to supply the prefixes for which the requesting router is requesting labels, as FIG. 12's fifth row illustrates.

As FIG. 12's fourth row indicates, the TDP_PIE_REQUEST_BIND PIE provides an optional-parameters field, which includes zero or more type-length-value fields. To specify a weight for the routes in the PIE's address list, the requesting router can include such a field of a type whose format is, say, like the one (not documented in the above-mentioned Rekhter et al. application) that FIG. 12's sixth row depicts. The weights may be used in modes other than the adjustable-bit-rate mode described above, so the value section begins with a flag that specifies the adjustable-bit-rate mode. It may be prudent to follow this with a reserved field to facilitate subsequent protocol enhancements, and the weight, preferably specified by an integer with a large range (e.g. $1-2^{64}$), occupies the last, relative-bandwidth field.

The weight that an ingress router such as FIG. 4's PE2 places in the request message is normally set in accordance with a configured policy. For example, the ingress router may be so configured that any routes falling within certain address ranges receive associated weights. But a transit router such as P2 more typically specifies a weight that it has received from an upstream router. For instance, if FIG. 4's PE2 includes a weight $w_1$ in the TDP_PIE_REQUEST_BIND PIE that it uses to request from P2 a label with which to tag cells destined for PE1, then P2 will ordinarily use the same weight in requesting a label for the same destination from P1.

An exception to this rule occurs in the case of a "merge." Suppose that P2 receives a request to bind a label to PE l's address not only from PE2 but also from neighbor P3. Suppose further that P3 specifies a weight $w_2$. In many ATM implementations, in which the bind-request mode of operation that FIG. 12 illustrates would more typically be used, P2 would employ the respective weights in requesting separate labels (VCIs) for the two flows to the same destination. But a non-ATM implementation of P2 (or an ATM implementation with enhancements to support merging) may merge the two flows, requesting only a single label for that destination. In that case, P2 would specify a weight $w_1+w_2$ in its bind request to P1.

Although the label advertisement just described occurs only in response to bind requests, the more-common approach, at least in non-ATM systems, is to make unsolicited label advertisements. That is, a router typically advertises a label to its upstream neighbors whenever it installs a route in its forwarding information base. Since the downstream router is the one that initiates the advertisement, the upstream router may need to supply the weight after the advertisement occurs. In that case it would be awkward, or at least wasteful, to employ a TDP_PIE_REQUEST_BIND PIE for that purpose, so it may be preferable to define a new PIE type, one that is more appropriate to applying a weight to an already-tagged route.

Figure 13:
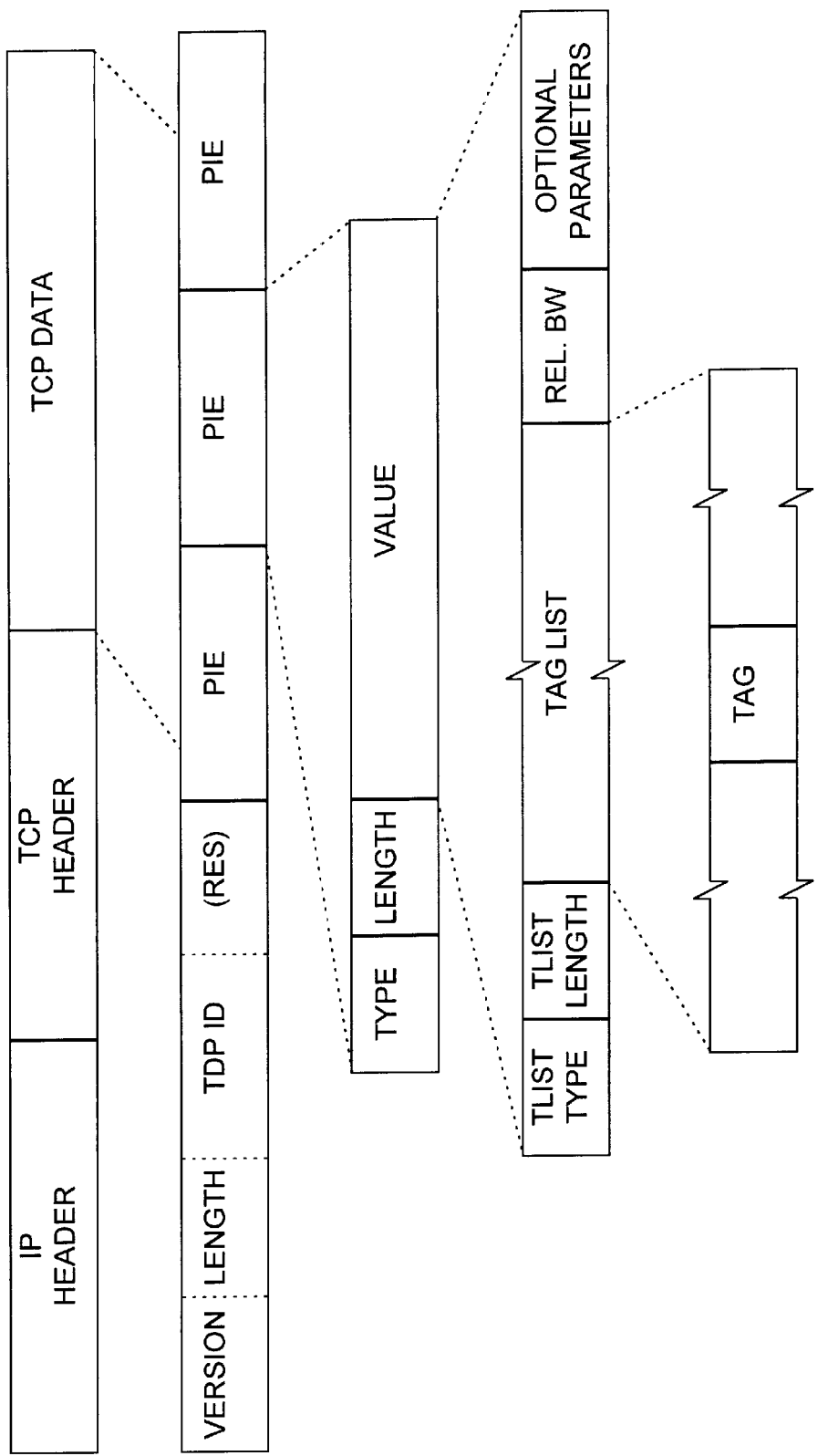
FIG. 13 is a diagram of another type of message format employed by label-switching ingress routers to distribute relative weights in forwarding different channels' packets.

FIG. 13 depicts a possible format for such a PIE. When an ingress router receives unsolicited labels from a downstream router, it inserts in its TDP session with that router a PIE whose type field contains a value representing the new type, which the downstream router should interpret in accordance with FIG. 13's fourth and fifth rows. Specifically, the downstream router should interpret that PIE's value field as specifying, in a relative-bandwidth field depicted in FIG. 13's fourth row, the weight that the downstream router is to associate with the routes that correspond to the (equal-length) tags in a tag-list field. That field occupies as many bytes as a TLIST LENGTH field specifies. Each of the listed tags is ordinarily a four-byte unsigned integer, but the example format provides a TLIST TYPE field to specify different tag formats. An optional-parameters field may also be included in order to transmit other information.

Although we prefer to implement the present invention's teachings in label-switching routers, their applicability is not so limited. A review of the foregoing description reveals that the present invention's approach to adjustable-bit-rate congestion avoidance can readily be implemented by, say, an Internet-service provider that employs the Internet Protocol conventionally, i.e., without a label-containing shim. When an edge router installs in its forwarding database a (prefix-identified) route for which the next-hop router is within the service-provider network, the edge router advises that next-hop router of the weight that the next-hop router should associate with that route. For this purpose, it can employ a protocol similar to TDP, i.e., one that employs TCP sessions between neighbors. A bandwidth-advertisement message whose format is essentially the same as that which FIG. 12 depicts would serve the purpose, although it would not need the tag field.

Suppose, for example, that the service provider depicted in FIG. 4 employs conventional IP routing rather than label switching. If edge router PE2 installs a route to CE1, for which transit router P2 is the next-hop router, PE2 advises the next-hop router P2 of the relative bandwidth to be allocated to that route. P2 accordingly records the specified relative bandwidth against that (prefix-specified) route and then similarly advises its own next hop for that route, namely, P1, of the relative bandwidth to be associated with the same prefix. In other words, the bandwidth-information propagation occurs just as in the previously described, label-switching system, with the exception that the routers do not additionally allocate labels in the process.

The propagation continues until it reaches edge router PE1, whose next hop for that route is not within the service-provider network that makes up what we may call an "IP-ABR domain." Resource-management messages then traverse that part of the route within the IP-ABR domain just as before, with the exception that the tag field in FIG. 8's second row is replaced with fields specifying the path type and identity. In this case, the path is of the IP-routed type and is identified by a prefix, a prefix length, and a type of service.

By employing the present invention's teachings, a service-provider network can limit virtually all packet loss to the network's edges and thus maximize its effective bandwidth use without suffering the type of availability limitation that besets traditional ATM approaches to adjustable-bit-rate congestion avoidance. The invention therefore constitutes a significant advance in the art.

What is claimed is:

1. A communications-packet router comprising:
   A) reception circuitry for:
      i) receiving from a given link resource-management messages that request respective explicit rates for routes whose packets the router is to transmit into the given link;
      ii) receiving from at least one other link weight-assignment messages that associate respective weights with routes whose packets the router is to transmit into the given link; and
      iii) receiving from at least one other link data packets including respective route indicators that specify routes respectively associated therewith for forwarding by the router into the given link; and
   B) transmission circuitry for transmitting packets over the given link at a total link rate, the rates at which the transmission circuitry forwards data packets associated with at least some routes if the total of the explicit rates requested for the given link exceeds the total link rate being less than the explicit rates that the resource-management messages have respectively requested therefor and being substantially proportional to the weights associated therewith.

2. A router as defined in claim 1 wherein the rates at which the transmission circuitry forwards data packets associated with respective routes if the total of the explicit rates requested for the given link is less than the total link rate are substantially equal to the explicit rates.

3. A router as defined in claim 1 wherein:
   A) the router further includes a forwarding information base containing a plurality of forwarding entries, indexed by labels respectively associated therewith, that contain forwarding information associated with respective routes;
   B) the router interprets the route indicators of at least some of the data packets as including labels; and
   C) the transmission circuitry forwards each such data packet in accordance with the forwarding information contained in the forwarding entry indexed by the label included in that data packet.

4. A router as defined in claim 3 wherein:
   A) the forwarding information in at least some entries includes respective replacement labels; and
   B) the transmission circuitry places the replacement labels in the packets that it forwards in accordance with the forwarding information in those entries.

5. A router as defined in claim 3 wherein the router responds to at least some of the received weight-assignment messages associating weights with respective routes by transmitting into the given link corresponding weight-assignment messages associating the same weights with the same routes.

6. A router as defined in claim 5 wherein the router responds to at least some of the resource-management messages requesting received explicit rates for respective routes by transmitting into one or more other links corresponding further resource-management messages requesting for those routes transmitted explicit rates that, if the total of the received explicit rates requested for the given link exceeds the total link rate, are less than the received explicit rates requested in the received resource-management messages to which the further resource-management messages respond and are substantially proportional to the weights associated with those routes.

7. A router as defined in claim 3 wherein the router responds to at least some of the resource-management messages requesting received explicit rates for respective routes by transmitting into one or more other links corresponding further resource-management messages requesting for those routes transmitted explicit rates that, if the total of the received explicit rates requested for the given link exceeds the total link rate, are less than the received explicit rates requested in the received resource-management messages to which the further resource-management messages respond and are substantially proportional to the weights associated with those routes.

8. A router as defined in claim 1 wherein the router responds to at least some of the received weight-assignment messages associating weights with respective routes by transmitting into the given link corresponding weight-assignment messages associating the same weights with the same routes.

9. A router as defined in claim 8 wherein the router responds to at least some of the resource-management messages requesting received explicit rates for respective routes by transmitting into one or more other links corresponding further resource-management messages requesting for those routes transmitted explicit rates that, if the total of the received explicit rates requested for the given link exceeds the total link rate, are less than the received explicit rates requested in the received resource-management messages to which the further resource-management messages respond and are substantially proportional to the weights associated with those routes.

10. A router as defined in claim 1 wherein the router responds to at least some of the resource-management messages requesting received explicit rates for respective routes by transmitting into one or more other links corresponding further resource-management messages requesting for those routes transmitted explicit rates that, if the total of the received explicit rates requested for the given link exceeds the total link rate, are less than the received explicit rates requested in the received resource-management messages to which the further resource-management messages respond and are substantially proportional to the weights associated with those routes.

11. A communications-packet router comprising:
A) reception circuitry for:
  i) receiving from a given link, with which the communications packet router associates a total link rate, IP datagrams containing resource-management messages that request respective explicit rates for routes whose packets the router is to transmit into the given link; and
  ii) receiving from at least one other link data packets including respective route indicators that specify routes respectively associated therewith for forwarding by the router into the given link;
B) circuitry for performing a comparison of the total link rate with the total of the explicit rates requested for the given link; and
C) transmission circuitry for transmitting packets over the given link at a total link rate, the rates at which the transmission circuitry forwards data packets associated with respective routes if the comparison indicates that the total of the explicit rates requested for the given link is less than the total link rate being substantially equal to the explicit rates requested for those routes.

12. A router as defined in claim 11 wherein:
A) the router further includes a forwarding information base containing a plurality of forwarding entries, indexed by labels respectively associated therewith, that contain forwarding information associated with respective routes;
B) the router interprets the route indicators of at least some of the data packets as including labels; and
C) the transmission circuitry forwards each such data packet in accordance with the forwarding information contained in the forwarding entry indexed by the label included in that data packet.

13. A router as defined in claim 12 wherein:
A) the forwarding information in at least some entries includes respective replacement labels; and
B) the transmission circuitry places the replacement labels in the packets that it forwards in accordance with the forwarding information in those entries.

14. A router as defined in claim 5 wherein the router responds to at least some of the resource-management messages requesting received explicit rates for respective routes by transmitting into one or more other links corresponding further resource-management messages requesting for those routes transmitted explicit rates that, if the total of the received explicit rates requested for the given link is less than the total link rate, are substantially equal to the received explicit rates.

15. For operating a communications-packet router, a method including the steps of:
A) receiving from a given link resource-management messages that request respective explicit rates for routes whose packets the router is to transmit into the given link;
B) receiving from at least one other link weight-assignment messages that associate respective weights with routes whose packets the router is to transmit into the given link;
C) receiving from at least one other link data packets including respective route indicators that specify routes respectively associated therewith for forwarding by the router into the given link; and
D) transmitting packets over the given link at a total link rate, the rates at which data packets associated with at least some routes are forwarded if the total of the explicit rates requested for the given link exceeds the total link rate being less than the explicit rates that the resource-management messages have respectively requested therefor and being substantially proportional to the weights associated therewith.

16. A method as defined in claim 15 wherein the rates at which the transmission circuitry forwards data packets associated with respective routes if the total of the explicit rates requested for the given link is less than the total link rate are substantially equal to the explicit rates.

17. A method as defined in claim 15 wherein:
A) the router includes a forwarding information base containing a plurality of forwarding entries, indexed by labels respectively associated therewith, that contain forwarding information associated with respective routes; and B) the method further includes the steps of:
   i) interpreting the route indicators of at least some of the data packets as including labels; and
   ii) forwarding each such data packet in accordance with the forwarding information contained in the forwarding entry indexed by the label included in that data packet.

18. A method as defined in claim 17 wherein:
A) the forwarding information in at least some entries includes respective replacement labels; and
B) the method further includes the step of placing the replacement labels in the packets forwarded in accordance with the forwarding information in those entries.

19. A method as defined in claim 17 further including the step of responding to at least some of the received weight-assignment messages associating weights with respective routes by transmitting into the given link corresponding weight-assignment messages associating the same weights with the same routes.

20. A method as defined in claim 19 further including the step of responding to at least some of the resource-management messages requesting received explicit rates for respective routes by transmitting into one or more other links corresponding further resource-management messages requesting for those routes transmitted explicit rates that, if the total of the received explicit rates requested for the given link exceeds the total link rate, are:
A) less than the received explicit rates requested in the received resource-management messages to which the further resource-management messages respond; and
B) substantially proportional to the weights associated with those routes.

21. A method as defined in claim 17 further including the step of responding to at least some of the resource-management messages requesting received explicit rates for respective routes by transmitting into one or more other links corresponding further resource-management messages requesting for those routes transmitted explicit rates that, if the total of the received explicit rates requested for the given link exceeds the total link rate, are:
A) less than the received explicit rates requested in the received resource-management messages to which the further resource-management messages respond; and
B) substantially proportional to the weights associated with those routes.

22. A method as defined in claim 15 further including the step of responding to at least some of the received weight-assignment messages associating weights with respective routes by transmitting into the given link corresponding weight-assignment messages associating the same weights with the same routes.

23. A method as defined in claim 22 further including the step of responding to at least some of the resource-management messages requesting received explicit rates for respective routes by transmitting into one or more other links corresponding further resource-management messages requesting for those routes transmitted explicit rates that, if the total of the received explicit rates requested for the given link exceeds the total link rate, are:
A) less than the received explicit rates requested in the received resource-management messages to which the further resource-management messages respond; and
B) substantially proportional to the weights associated with those routes.

24. A method as defined in claim 15 further including the step of responding to at least some of the resource-management messages requesting received explicit rates for respective routes by transmitting into one or more other links corresponding further resource-management messages requesting for those routes transmitted explicit rates that, if the total of the received explicit rates requested for the given link exceeds the total link rate, are:
A) less than the received explicit rates requested in the received resource-management messages to which the further resource-management messages respond; and
B) substantially proportional to the weights associated with those routes.

25. For operating a communications-packet router, a method including the steps of:
A) receiving from a given link IP datagrams containing resource-management messages that request respective explicit rates for routes whose packets the router is to transmit into the given link;
B) setting a total link rate for the given link;
C) receiving from at least one other link data packets including respective route indicators that specify routes respectively associated therewith for forwarding by the router into the given link;
D) performing a comparison of the total link rate with the total of the explicit rates requested for the given link; and
E) transmitting received data packets over the given link, the rates at which the data packets associated with respective routes are forwarded if the comparison indicates that the total of the explicit rates requested for the given link is less than the total link rate being substantially equal to the explicit rates requested for those routes.

26. A method as defined in claim 25 wherein:
A) the router further includes a forwarding information base containing a plurality of forwarding entries, indexed by labels respectively associated therewith, that contain forwarding information associated with respective routes; and
B) the method includes the steps of:
   i) interpreting the route indicators of at least some of the data packets as including labels; and
   ii) forwarding each such data packet in accordance with the forwarding information contained in the forwarding entry indexed by the label included in that data packet.

27. A method as defined in claim 26 wherein:
A) the forwarding information in at least some entries includes respective replacement labels; and
B) the method further includes placing the replacement labels in the packets that are forwarded in accordance with the forwarding information in those entries.

28. A method as defined in claim 19 further including the step of responding to at least some of the resource-management messages requesting received explicit rates for respective routes by transmitting into one or more other links corresponding further resource-management messages requesting for those routes transmitted explicit rates that, if the total of the received explicit rates requested for the given link is less than the total link rate, are substantially equal to the received explicit rates.

* * * * *